(12) United States Patent
Yang et al.

(10) Patent No.: US 12,351,039 B2
(45) Date of Patent: Jul. 8, 2025

(54) METHOD FOR CONTROLLING A MOTION OF A VEHICLE, DATA PROCESSING APPARATUS, COMPUTER PROGRAM, COMPUTER-READABLE STORAGE MEDIUM, AND VEHICLE PROPULSION SYSTEM

(71) Applicant: Volvo Car Corporation, Gothenburg (SE)

(72) Inventors: Derong Yang, Gothenburg (SE);
Juliette Torinsson, Gothenburg (SE);
Mats Jonasson, Gothenburg (SE);
Bengt Johan Henrik Jacobson, Gothenburg (SE)

(73) Assignee: VOLVO CAR CORPORATION, Gothenburg (SE)

( * ) Notice: Subject to any disclaimer, the term of this patent is extended or adjusted under 35 U.S.C. 154(b) by 233 days.

(21) Appl. No.: 18/299,233

(22) Filed: Apr. 12, 2023

(65) Prior Publication Data
US 2023/0331097 A1 Oct. 19, 2023

(30) Foreign Application Priority Data
Apr. 13, 2022 (EP) ..................................... 22168077

(51) Int. Cl.
*B60L 15/20* (2006.01)
(52) U.S. Cl.
CPC ....... *B60L 15/2036* (2013.01); *B60L 15/2045* (2013.01); *B60L 2240/24* (2013.01);
(Continued)

(58) Field of Classification Search
None
See application file for complete search history.

(56) References Cited

U.S. PATENT DOCUMENTS 9,199,526 B2 * 12/2015 Hasuda ................ B60W 10/08
10,875,569 B2 * 12/2020 Ko ........................ B60W 30/06
(Continued)

FOREIGN PATENT DOCUMENTS

WO 2022042818 A1 3/2022

OTHER PUBLICATIONS

Extended EP Search Report for EP Application No. 22168077.0 dated Sep. 23, 2022, 9 pages.
(Continued)

*Primary Examiner* — Todd Melton
(74) *Attorney, Agent, or Firm* — Amin, Turocy & Watson, LLP

(57) ABSTRACT

The disclosure relates to a method for controlling a motion of a vehicle. The vehicle can comprise an electric powertrain having at least one drive axle with a left output shaft and a right output shaft, a power assisted steering unit, and a propulsion torque distribution unit. The propulsion torque distribution unit can be configured to allocate wheel torques of different magnitudes to the left output shaft and the right output shaft respectively. The method can comprise receiving a total longitudinal force target value, a total lateral force target value and a total yaw moment target value. The method can further comprise determining a first wheel torque for the left output shaft and a second wheel torque for the right output shaft which minimize a total power consumption of the drive axle and the power assisted steering unit.

18 Claims, 2 Drawing Sheets

(52) U.S. Cl.
    CPC ... *B60L 2240/423* (2013.01); *B60L 2240/463* (2013.01); *B60L 2240/465* (2013.01)

(56) References Cited

U.S. PATENT DOCUMENTS

2017/0210414 A1    7/2017  Sato
2022/0258723 A1*   8/2022  Hu ..................... B60W 30/19

OTHER PUBLICATIONS

Koehler, et al. "Energy-Efficiency Optimization of Torque Vectoring Control for Battery Electric Vehicles" IEE Intelligent Transportation Systems Magazine, 59, Fall 2017, 16 pages.

* cited by examiner

METHOD FOR CONTROLLING A MOTION OF A VEHICLE, DATA PROCESSING APPARATUS, COMPUTER PROGRAM, COMPUTER-READABLE STORAGE MEDIUM, AND VEHICLE PROPULSION SYSTEM

CROSS-REFERENCE TO RELATED APPLICATIONS

This application claims the benefit of and priority to pending EP patent application serial number 22168077.0, filed Apr. 13, 2022 and entitled "METHOD FOR CONTROLLING A MOTION OF A VEHICLE, DATA PROCESSING APPARATUS, COMPUTER PROGRAM, COMPUTER-READABLE STORAGE MEDIUM, AND VEHICLE PROPULSION SYSTEM," the entirety of which is hereby incorporated by reference herein.

TECHNICAL FIELD

The present disclosure relates to vehicles and, more particularly, to controlling a motion of a vehicle. Additionally, the present disclosure relates to a data processing apparatus, a computer program, and a computer-readable storage medium. Additionally, the present disclosure relates to a vehicle propulsion system comprising an electric powertrain having at least one drive axle with a left output shaft and a right output shaft.

BACKGROUND

Torque distribution units can be configured to allocate wheel torques of different magnitudes to the left output shaft and the right output shaft to provide a torque vectoring functionality. Torque vectoring can be applied in order to make a vehicle drive along a curved trajectory. To this end, the wheel torque on an outside wheel can be set to be larger than the wheel torque at the inner wheel. In other words, torque vectoring is a method that distributes differential wheel torque between the left and right side of the vehicle. Torque vectoring can be applied in order to support the steering of a vehicle.

SUMMARY

A vehicle can comprise an electric powertrain having at least one drive axle with a left output shaft and a right output shaft. Moreover, the vehicle can comprise a power assisted steering unit and a propulsion torque distribution unit. The propulsion torque distribution unit can be configured to allocate wheel torques of different magnitudes to the left output shaft and the right output shaft respectively.

Additionally, a propulsion system can comprise a power assisted steering unit, a propulsion torque distribution unit being configured to allocate wheel torques of different magnitudes to the left output shaft and the right output shaft respectively, and a data processing apparatus as mentioned above.

It is noted that a propulsion torque distribution unit may also be called a torque vectoring unit or an active yaw unit.

It is an objective of the present disclosure to further improve the energy-efficiency of a vehicle having an electric powertrain.

The problem is at least partially solved or alleviated by the subject matter of the independent claims of the present disclosure, wherein further examples are incorporated in the dependent claims.

According to a first aspect, there is provided a method for controlling a motion of a vehicle, wherein the vehicle comprises an electric powertrain having at least one drive axle with a left output shaft and a right output shaft. The vehicle also comprises a power assisted steering unit and a propulsion torque distribution unit. The propulsion torque distribution unit is configured to allocate wheel torques of different magnitudes to the left output shaft and the right output shaft respectively. The method comprises:
  receiving a total longitudinal force target value, a total lateral force target value and a total yaw moment target value,
  determining a first wheel torque value for the left output shaft and a second wheel torque value for the right output shaft which minimize a total power consumption of the drive axle and the power assisted steering unit under the condition that the total longitudinal force target value, the total lateral force target value and the total yaw moment target value are met, and
  providing the determined first wheel torque value and the determined second wheel torque value to the drive axle.

In this context, the power assisted steering unit is powered by electricity. Consequently, it may be designated as an electric power assisted steering (EPAS) unit.

In a case in which the vehicle is controlled by a human driver, the power assisted steering unit is configured to add a steering torque along with the driver's hand wheel torque such that the driver is able to steer the vehicle using a comparatively low hand wheel torque. This enhances driving comfort. In a case in which the vehicle is operated in a fully or partially autonomous driving mode, the power assisted steering unit may provide the entire steering torque, i.e., steer the vehicle without human interaction.

The total longitudinal force target value, the total lateral force target value and the total yaw moment target value may be provided by a known driver interpreter unit which determines the total longitudinal force target value, the total lateral force target value and the total yaw moment target value based on a brake pedal position, an accelerator pedal position, a steering angle and a steering torque.

If the first wheel torque value and the second wheel torque value are provided such that a total power consumption of the drive axle and the power assisted steering unit is minimized, an overall power consumption of the vehicle can be reduced. This leads to an increased driving range of the vehicle. In other words, the energy efficiency of the vehicle is increased.

It is noted that the determined first wheel torque value and the determined second wheel torque value may be provided to the drive axle via the propulsion torque distribution unit.

It is further noted that even though the method has been explained in connection with an electric powertrain having one drive axle with a left output shaft and a right output shaft, the method can also be applied to electric powertrains having two or more drive axles. An example thereof is an electric powertrain for a four-wheel drive vehicle. In such a case, the wheel torque values for all output shafts of the powertrain can be determined such that the total power consumption of all drive axles and the power assisted steering unit is minimized under the conditions as mentioned above. Also, in such a case the total power consumption of the vehicle is reduced.

The general idea underlying the present disclosure is to consider the power consumption of the at least one drive axle and the power assisted steering unit together. If the at least one drive axle performs a torque vectoring method, both the power assisted steering unit and the at least one drive axle can be used to steer the vehicle. If they are considered together, a global optimum of power consumption can be found as compared to operating the vehicle using a local power consumption optimum of the power assisted steering unit and a local power consumption optimum of the at least one drive axle. Thus, using the present disclosure, total power consumption of the vehicle may be reduced.

In more detail, if a wheel of a vehicle is steered, a lateral force $F_y$ is generated in the tire-to-ground contact. In standard vehicles, this force is located at a distance $L_{trail}$ from the steering axis. Consequently, a self-aligning moment $T_{align}$ is generated which is oriented towards the neutral position of the wheel. In other words, the vehicle tends to come back to driving straight ahead. The self-aligning moment can be written as follows:

$$T_{align} = F_y \cdot L_{trail}$$

If the vehicle is to be kept on the curved trajectory, the self-aligning moment needs to be balanced by a counter moment $T_{driver}$ being provided by the human driver and a counter moment $T_{assist}$ provided by the power assisted steering unit, if a human driver is steering the vehicle. If the vehicle is steered autonomously, only the counter moment $T_{assist}$ is available.

In a case in which the steering unit of the vehicle comprises a rack and pinion mechanism, the counter moments $T_{driver}$ and $T_{assist}$ act on the wheel via the steering rack. A corresponding rack force $F_{rack}$ can be written as follows, wherein $L_{arm}$ designates a length of a lever arm of the rack with respect to the wheel:

$$F_{rack} = \frac{T_{align}}{L_{arm}}$$

It is noted that, of course, the rack and pinion mechanism is only an example and may be replaced by any other suitable mechanism such as a belt mechanism.

Moreover, a motion of the rack can be described by the following equation, wherein $m_{rack}$ is the mass of the rack, x is the position of the rack, R is the pinion gear radius and b is the steering column damping.

$$m_{rack} \ddot{x} = \frac{T_{driver} + T_{assist}}{R} - b\dot{x} - F_{rack}$$

Consequently, the counter moment can be written as follows:

$$T_{driver} + T_{assist} = R \left( m_{rack} \ddot{x} + b\dot{x} + \frac{F_y L_{trail}}{L_{arm}} \right)$$

Thus, the torque necessary for balancing the self-aligning moment $T_{align}$ is a function of the lateral force $F_y$ at the steered wheel. If the lateral force $F_y$ is reduced, also the self-aligning moment $T_{align}$ is reduced.

Considering torque vectoring, the motion of the vehicle can be described by the following formula, wherein the first formula is a balance of forces along the lateral direction. The mass of the vehicle is denoted $m_{vehicle}$ and the acceleration of the vehicle in the lateral direction is denoted $a_y$. It is assumed that the vehicle has two axles and the lateral force at the front axle is denoted $F_{fy}$. The lateral force at the rear axle is denoted $F_{ry}$. The second formula is a balance of moments, wherein $l_f$ designates the lever arm of the lateral force at the front axle and $l_r$ designates the lever arm of the lateral force at the rear axle. The moment resulting from torque vectoring is designated $M_{TV}$.

$$m_{vehicle} a_y = F_{fy} + F_{ry}$$

$$0 = F_{fy} l_f - F_{ry} l_r + M_{TV}$$

Since the torque vectoring moment $M_{TV}$ is generated by applying different torques to the driven wheels, it can be written as a function of a longitudinal force $F_{x,left}$ being provided at the left wheel and a longitudinal force $F_{x,right}$ being provided at the right wheel. A track width of the vehicle is denoted w.

$$M_{TV} = \frac{w}{2}(F_{x,right} - F_{x,left})$$

Consequently, the lateral forces at the front axle and the rear axle can be written as follows:

$$F_{fy} = \frac{m_{vehicle} a_y l_r - M_{TV}}{l_f + l_r}$$

$$F_{ry} = \frac{m_{vehicle} a_y l_f + M_{TV}}{l_f + l_r}$$

Thus, the lateral force $F_{fy}$ at the front axle and the lateral force $F_{ry}$ at the rear axle are functions of the moment $M_{TV}$ resulting from torque vectoring. It is noted that the force at the rear axle is increased if the torque vectoring moment $M_{TV}$ is increased. The force at the front axle is decreased if the torque vectoring moment $M_{TV}$ is increased.

A decreased lateral force at the front axle means that only a smaller wheel angle and a smaller angular rate are needed. Thus, the moment $T_{assist}$ provided by the power assisted steering unit can be smaller. Consequently, the power assisted steering unit needs less power.

The power consumption $P_{assist}$ of the power assisted steering unit can be described as follows, wherein x designates a position of the rack and R is again the pinion gear radius. The efficiency of the power assisted steering unit is denoted $\eta$. The power consumption $P_{assist}$ can also be written as a function of the current $I_{assist}$ and the voltage $U_{assist}$ used in the power assisted steering unit.

$$P_{assist} = \frac{T_{assist} \dot{x} R}{\eta} = U_{assist} \cdot I_{assist}$$

The power consumption $P_{PT}$ of the powertrain can be written as a sum of the power consumption of all electric motors comprised by the powertrain. In this context, each power consumption of an electric motor can be written as the product of the corresponding motor current and the corresponding motor voltage. This is denoted below for the case of a drivetrain with four electric motors.

$$P_{PT} = P_1 + P_2 + P_3 + P_4$$

$$P_{PT} = U_1 I_1 + U_2 I_2 + U_3 I_3 + U_4 I_4$$

Additionally, the power consumption of each of the electric motors can be written as a function of the corresponding wheel torque. This is done in the following for an electric motor i. The corresponding wheel torque is denoted $T_i$. The corresponding rotational speed is $n_i$ and the efficiency is $\eta_i$.

$$P_i = \frac{T_i n_i}{\eta_i}$$

Consequently, the minimization problem to be solved for determining the first wheel torque value $T_1$ for the left output shaft and the second wheel torque value $T_2$ for the right output shaft which minimize the total power consumption of the drive axle and the power assisted steering unit, can be written as follows:

$$\min_{T1,T2} (P_{PT} + P_{assist})$$

In a case in which four driven wheels are considered, the minimization problem is as follows. In this context, a third wheel torque $T_3$ for a second left output shaft and a fourth wheel torque $T_4$ for a second right output shaft need to be determined.

$$\min_{T1,T2,T3,T4} (P_{PT} + P_{assist})$$

The minimization problem is subject to the condition that the total longitudinal force target value $F_{x,req}$ is met. This can be written as follows, wherein $r_{wheel}$ is the effective wheel radius and n is the gear ratio of the electric motors. For the ease of representation, the condition is denoted for the case of four driven wheels. The letter i denotes a counter for the wheels.

$$\frac{n}{r_{wheel}} \sum_{i=1}^{4} T_i = F_{x,req}$$

Moreover, the minimization problem is subject to the condition that the total lateral force target value $F_{y,req}$ is met. In other words, the cornering demand needs to be met. Again, the condition is denoted for the case of four driven wheels for the ease of representation. The letter i denotes a counter for the wheels.

$$\sum_{i=1}^{4} F_{y,i} = F_{y,req}$$

Additionally, the yaw dynamics of the vehicles need to be balanced. This means that the total yaw moment target value $M_{z,req}$ needs to be met. This is an additional condition to which the solution of the minimization problem is subject. As before, the condition is denoted for the case of four driven wheels, wherein the wheels and the corresponding forces and torques are numbered from one to four.

$$(F_{y,1} + F_{y,2})l_f - (F_{y,3} + F_{y,4})l_r + \frac{nw}{2r_{wheel}}(-T_1 + T_2 - T_3 + T_4) = M_{z,req}$$

The minimization problem as outline above may for example be solved by a quadratic nonlinear programming solver. Such a solver is for example provided in the quadprog toolbox in Matlab. Alternatively, or additionally, an ACADO (Automatic Control And Dynamic Optimization) toolkit can be used. A further alternative is a so-called IPOPT (interior Point Optimizer) algorithm. Also, Sequential Quadratic Programming (SQP) may be used to solve the minimization problem.

Thus, the wheel torque values are determined and provided to the relevant parts of the vehicle such that an overall power consumption is reduced while the desired driving behavior of the vehicle is maintained.

According to an example, the method further comprises providing a formula or a look-up table of the total power consumption of the drive axle and the power assisted steering unit as a function of the first wheel torque value and the second wheel torque value. Consequently, the determination of the first wheel torque for the left output shaft and the second wheel torque for the right output shaft of the drive axle which minimize the total power consumption is facilitated. Moreover, using a formula or a look-up table is computationally efficient. If a formula is used, it can be derived from the formulae as explained above. In a case in which a look-up table is used, the look-up table can be generated in a test environment, where the total power consumption of the drive axle and the power assisted steering unit is measured while different first wheel torques and different second wheel torques are applied.

In an example, the method further comprises determining the first wheel torque value and the second wheel torque value under the condition that a rear lateral force is equal or below a rear lateral force threshold. Consequently, oversteering of the vehicle is avoided. This enhances driving safety.

According to an example, the method further comprises deactivating the propulsion torque distribution unit if the rear lateral force exceeds a rear lateral force deactivation threshold. This means that no torque vectoring is applied. Consequently, the same torque is applied on both the left output shaft and the right output shaft, i.e., the first wheel torque and the second wheel torque are of the same magnitude. Also, this measure avoids oversteering of the vehicle and thus increases driving safety. In this context, the rear lateral force deactivation threshold may be the same as the rear lateral force threshold as mentioned above.

In an example, the method further comprises deactivating the propulsion torque distribution unit if a rear side slip exceeds a rear side slip threshold. Again, deactivating the propulsion torque distribution unit means that no torque vectoring is applied, i.e., the same torque is provided at the left output shaft and the right output shaft. This enhances driving safety.

The method may be at least partly computer-implemented, and may be implemented in software or in hardware, or in software and hardware. Further, the method may be carried out by computer program instructions running on means that provide data processing functions. The data processing means may be a suitable computing means, such as an electronic control module etc., which may also be a distributed computer system. The data processing means or the computer, respectively, may comprise one or more of a processor, a memory, a data interface, or the like.

According to a second aspect, there is provided a data processing apparatus comprising a first communication interface configured to receive a total longitudinal force target value, a total lateral force target value, and a total yaw moment target value. Moreover, the data processing apparatus comprises a second communication interface configured to provide at least a first wheel torque value and a second wheel torque value to a drive axle. Furthermore, the data processing apparatus comprises means for carrying out the method of the present disclosure. Using such a data processing apparatus, the first wheel torque value and the second wheel torque value may be determined such that a total power consumption of the drive axle and the power assisted steering unit is minimized. Thus, an overall power consumption of the vehicle is reduced. This leads to an increased driving range of the vehicle. In other words, the energy efficiency of the vehicle is increased.

The first wheel torque value and the second wheel torque value may be provided to the drive axle via the propulsion torque distribution unit.

Again, the total longitudinal force target value, the total lateral force target value and the total yaw moment target value may be provided by a known driver interpreter unit which determines the total longitudinal force target value, the total lateral force target value and the total yaw moment target value based on a brake pedal position, an accelerator pedal position, a steering angle and a steering torque. The driver interpreter unit may be communicatively connected to the data processing apparatus via the first communication interface.

According to a third aspect, there is provided a computer program comprising instructions which, when the computer program is executed by a computer, cause the computer to carry out the method according to the present disclosure. Using such a computer program, the overall power consumption of the vehicle is reduced. Consequently, a driving range is increased.

According to a fourth aspect, there is provided a computer-readable storage medium comprising instructions which, when executed by a computer, cause the computer to carry out the method according to the present disclosure. Thus, also the computer-readable storage medium leads to a reduced overall power consumption of the vehicle. This leads to an increased driving range.

According to a fifth aspect, there is provided a vehicle propulsion system comprising an electric powertrain having at least one drive axle with a left output shaft and a right output shaft. Moreover, the vehicle propulsion system comprises a power assisted steering unit, a propulsion torque distribution unit being configured to allocate wheel torques of different magnitudes to the left output shaft and the right output shaft respectively, and a data processing apparatus according to the present disclosure. The data processing apparatus is communicatively coupled to the power assisted steering unit and the propulsion torque distribution unit. Thus, in such a vehicle propulsion system, the first wheel torque value and the second wheel torque value may be determined such that a total power consumption of the drive axle and the power assisted steering unit is minimized. Thus, an overall power consumption of the vehicle is reduced. This leads to an increased driving range of the vehicle. In other words, the energy efficiency of the vehicle is increased.

It is noted that the data processing apparatus may be communicatively coupled to the drive axle via the propulsion torque distribution unit.

In an example, a wheel may be mounted to each of the output shafts.

In an example, the drive axle comprises a left electric machine being coupled to the left output shaft and a right electric machine being coupled to the right output shaft. Consequently, a wheel torque may be provided at each of the left output shaft and the right output shaft with high precision and reliability. Moreover, the torques provided by the left electric machine and the right electric machine are generally independent from one another. A gearing unit may be interposed between each electric machine and the corresponding output shaft. The power consumption of the drive axle is, thus, the sum of the power consumption of the left electric machine and the right electric machine.

In an example, the vehicle propulsion system further comprises a rear side slip detector for determining a rear side slip of the vehicle. The rear side slip detector may be realized as a so-called inertial measurement unit. Thus, rear side slip can be detected with high precision and high reliability. The vehicle can be controlled such that rear side slip does not occur or only to a pre-defined extent. Consequently, the vehicle has a safe driving behavior.

It should be noted that the above examples may be combined with each other irrespective of the aspect involved. Accordingly, the method may be combined with structural features and, likewise, the data processing apparatus, the computer program, the computer-readable storage medium and the vehicle propulsion system may be combined with features described above with regard to the method.

These and other aspects of the present disclosure will become apparent from and elucidated with reference to the examples described hereinafter.

BRIEF DESCRIPTION OF THE DRAWINGS

Examples of the present disclosure will be described in the following with reference to the following drawings.

DETAILED DESCRIPTION

The figures are merely schematic representations and serve only to illustrate examples of the disclosure. Identical or equivalent elements are in principle provided with the same reference signs.

Figure 1:
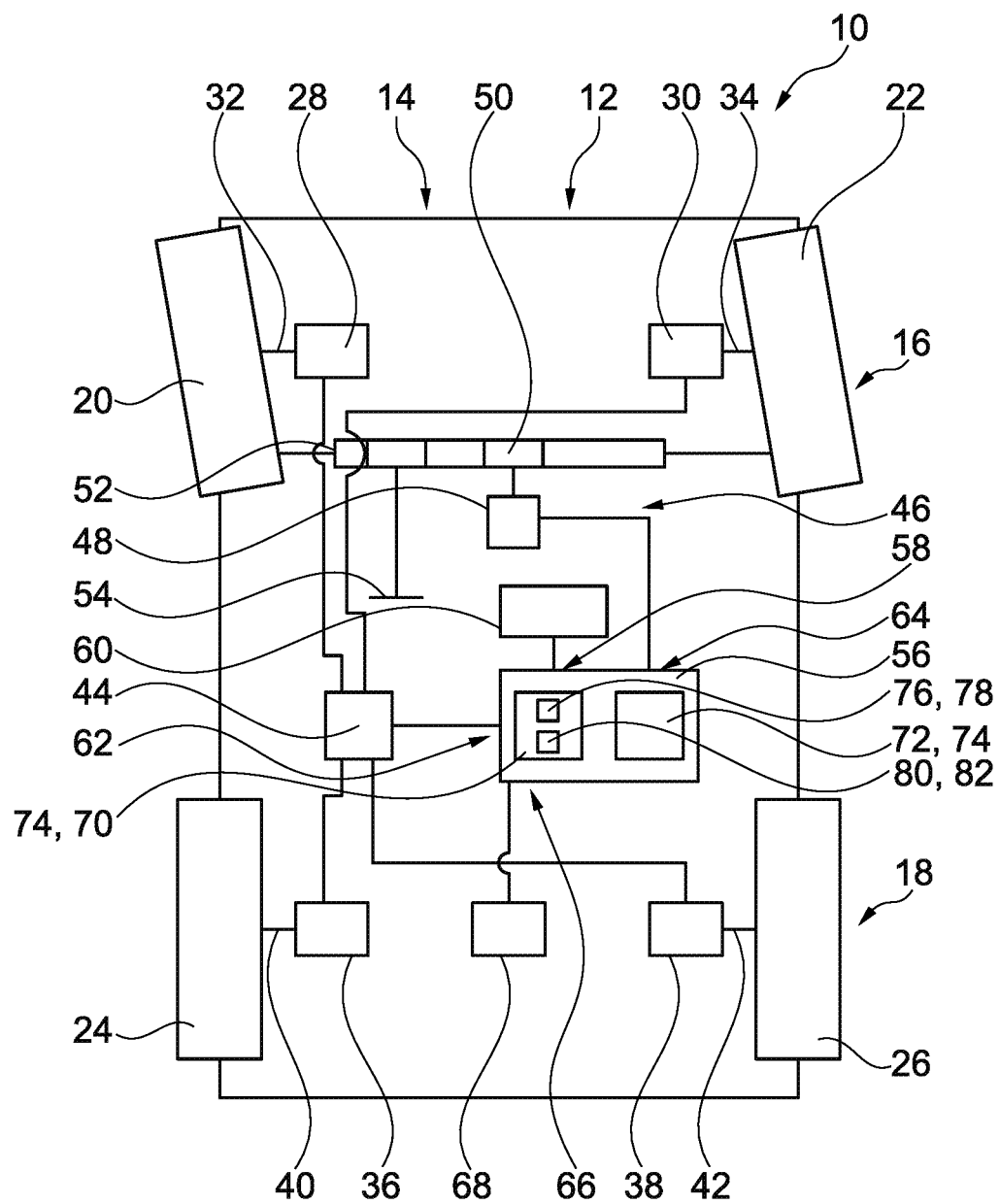
FIG. 1 schematically shows a vehicle having a vehicle propulsion system according to the present disclosure with a data processing apparatus according to the present disclosure having thereon a computer-readable storage medium according to the present disclosure and a computer program according to the present disclosure, wherein the data processing apparatus is configured to carry out a method according to the present disclosure.

FIG. 1 shows a vehicle 10 having a propulsion system 12.

The propulsion system 12 comprises an electric powertrain 14.

In the example shown in the figure, the electric powertrain 14 comprises two drive axles 16, 18.

The drive axle 16 is a front drive axle and the drive axle 18 is a rear drive axle.

On the drive axle 16 two front wheels 20, 22 are mounted.

On the drive axle 18, two rear wheels 24, 26 are mounted.

The drive axle 16 comprises a left electric machine 28 and a right electric machine 30. The left electric machine 28 is coupled to front wheel 20 via a left output shaft 32 and the right electric machine 30 is coupled to the right front wheel 22 via a right output shaft 34.

The drive axle 18 comprises a left electric machine 36 and a right electric machine 38. The left electric machine 36 is coupled to rear wheel 24 via a left output shaft 40 and the right electric machine 38 is coupled to the right rear wheel 26 via a right output shaft 42.

All electric machines 28, 30, 36, 38 can be communicatively coupled to a propulsion torque distribution unit 44.

The propulsion torque distribution unit 44 is configured to allocate wheel torques of different magnitudes to the output shafts 32, 34, 40, 42. In other words, the propulsion torque distribution unit is configured to send a control signal to each of the electric machines 28, 30, 36, 38 and thereby trigger each of the electric machines 28, 30, 36, 38 to provide a specific wheel torque at the respective output shaft 32, 34, 40, 42.

In simplified words, the torque distribution unit 44 may be called an electric motor control unit which is able to provide a torque vectoring functionality. Consequently, the propulsion torque distribution unit may also be called a torque vectoring unit or an active yaw unit.

Moreover, the vehicle propulsion system 12 comprises a power assisted steering unit 46.

The power assisted steering unit 46 comprises a steering actuator 48 with an electric machine having a shaft with a pinion 50. The pinion 50 engages a rack 52 of a steering system of the vehicle 10 such that the steering actuator 48, more generally speaking the assisted steering unit 46, can move the rack 52 either with or without an additional force being provided on the rack 52 by a user acting on a steering wheel 54 of the vehicle 10.

The vehicle propulsion system 12 also comprises a data processing apparatus 56.

The data processing apparatus 56 comprises a first communication interface 58.

The first communication interface 58 is communicatively connected to a driver interpreter unit 60.

The driver interpreter unit 60 is configured to provide a total longitudinal force target value, a total lateral force target value, and a total yaw moment value based on a brake pedal position, an accelerator pedal position, a steering angle and a steering torque.

The first communication interface 58 is configured to receive the total longitudinal force target value, the total lateral force target value, and the total yaw moment value.

The data processing apparatus 56 also comprises a second communication interface 62 which is communicatively connected to the propulsion torque distribution unit 44.

The second communication interface 62 is configured to provide a first wheel torque value, a second wheel torque value, a third wheel torque value and a fourth wheel torque value to the propulsion torque distribution unit 44. Since the propulsion torque distribution unit 44 is communicatively connected to the drive axles 16, 18 and more precisely to the electric machines 28, 30, 36, 38, also the data processing apparatus 56 is communicatively connected to the drive axles 16, 18 and the electric machines 28, 30, 36, 38.

Additionally, the data processing apparatus 56 has a third communication interface 64.

The third communication interface 64 is communicatively connected to the power assisted steering unit 46, more precisely to the actuator 48.

Moreover, the data processing apparatus 56 has a fourth communication interface 66. A rear side slip detector 68 is connected to the data processing apparatus 56 via the fourth communication interface 66.

The rear side slip detector 68 is configured to for determine a rear side slip of the vehicle 10.

It is noted that even though the data processing apparatus 56, the propulsion torque distribution unit 44 and the driver interpreter unit 60 are represented as separate units, one or more of these units may be integrated into a single unit. For example, the data processing apparatus 56 and the propulsion torque distribution unit 44 may be united in a single unit.

The data processing apparatus 56 comprises a data storage unit 70 and a data processing unit 72.

The data processing apparatus 56 is configured to carry out a method for controlling a motion of the vehicle 10.

In more detail, the data storage unit 70 and the data processing unit 72 form means 74 for carrying out the method for controlling a motion of the vehicle 10.

To this end, the data storage unit 70 comprises a computer-readable storage medium 76 comprising instructions which, when executed by the data processing unit 72 or more generally a computer, cause the data processing unit 72 to carry out the method.

Thus, a computer program 78 is provided by the data storage unit 76.

The computer program 78 comprises instructions which, when the computer program 78 is executed by the data processing unit 72 or more generally a computer, cause the data processing unit 72 to carry out the method.

Figure 2:
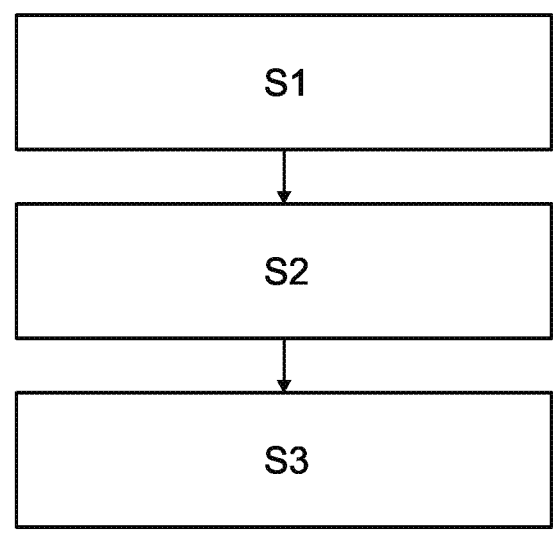
FIG. 2 shows steps of the method according to the present disclosure.

The method for controlling a motion of the vehicle 10 will now be explained in connection with FIG. 2.

A first step S1 of the method comprises receiving a total longitudinal force target value, a total lateral force target value and a total yaw moment target value. As has already been explained above, these parameters are provided to the data processing unit 56 by the driver interpreter unit 60 via the first communication interface 58.

In a second step S2 a first wheel torque value for the left output shaft 32 of the drive axle 16, a second wheel torque value for the right output shaft 34 of the drive axle 16, a third wheel torque value for the left output shaft 40 of the drive axle 18, and a fourth wheel torque value for the right output shaft 42 of the drive axle 18 are determined.

The wheel torque values are determined such that they minimize a total power consumption of the drive axles 16, 18 and the power assisted steering unit 46.

To this end, a set 80 of formulae as has already been described above or a look-up table 82 of the total power consumption of the drive axles 16, 18 and the power assisted steering unit 46 as a function of the first wheel torque, the second wheel torque, the third wheel torque and the fourth wheel torque is provided. Also, the look-up table 82 has already been explained above.

A condition to be met by the minimization is that the total longitudinal force target value, the total lateral force target value, and the total yaw moment target value are met. Put otherwise, the minimization of the total power consumption must not influence the driving behavior required by the driver.

A further condition is that a rear lateral force of the vehicle 10 is equal or below a rear lateral force threshold. Thus, the wheel torque values must be determined such that the vehicle 10 does not oversteer.

The determined first wheel torque value, the second wheel torque value, the third wheel torque value and the fourth wheel torque value are then provided to the drive axles 16, 18 in a third step S3. In the present example this is done via the propulsion torque distribution unit 44.

While driving, the rear side slip detector 68 is active and constantly or periodically monitors a rear side slip of the vehicle 10 and communicates the detected rear side slip to the data processing apparatus 56.

On the data storage unit 70 a rear side slip threshold is provided.

The data processing apparatus 56 is configured to periodically compare the detected rear side slip and the rear side slip threshold.

If it is found that the detected rear side slip exceeds the rear side slip threshold, the propulsion torque distribution unit 44 is deactivated. This means that the same torque is provided to each of the output shafts 32, 34, 40, 42.

It is noted that in an alternative, the propulsion torque distribution unit 44 may also be deactivated if the rear lateral force exceeds a rear lateral force deactivation threshold.

Other variations to the disclosed examples can be understood and effected by those skilled in the art in practicing the claimed disclosure, from the study of the drawings, the disclosure, and the appended claims. In the claims the word "comprising" does not exclude other elements or steps and the indefinite article "a" or "an" does not exclude a plurality. A single processor or other unit may fulfill the functions of several items or steps recited in the claims. The mere fact that certain measures are recited in mutually different dependent claims does not indicate that a combination of these measures cannot be used to advantage. A computer program may be stored/distributed on a suitable medium such as an optical storage medium or a solid-state medium supplied together with or as part of other hardware, but may also be distributed in other forms, such as via the Internet or other wired or wireless telecommunication systems. Any reference signs in the claims should not be construed as limiting the scope of the claims.

LIST OF REFERENCE SIGNS 10 vehicle
12 propulsion system
14 powertrain
16 drive axle
18 drive axle
20 front wheel
22 front wheel
24 rear wheel
26 rear wheel
28 left electric machine
30 right electric machine
32 left output shaft
34 right output shaft
36 left electric machine
38 right electric machine
40 left output shaft
42 right output shaft
44 propulsion torque distribution unit
46 power assisted steering unit
48 steering actuator
50 pinion
52 rack
54 steering wheel
56 data processing apparatus
58 first communication interface
60 driver interpreter unit
62 second communication interface
64 third communication interface
66 fourth communication interface.
68 rear side slip detector
70 data storage unit
72 data processing unit
74 means to carry out the method for controlling a motion of a vehicle
76 computer-readable storage medium
78 computer program
80 set of formulae
82 look-up table
S1 first step
S2 second step
S3 third step

What is claimed is:

1. A method for controlling a motion of a vehicle comprising an electric powertrain comprising a drive axle with a left output shaft and a right output shaft, a power assisted steering unit, and a propulsion torque distribution unit, the method comprising:
receiving, by a system comprising a processor, a total longitudinal force target value, a total lateral force target value, and a total yaw moment target value;
determining, by the system, a first wheel torque value for the left output shaft and a second wheel torque value for the right output shaft which minimize a total power consumption of the drive axle and the power assisted steering unit under a condition that the total longitudinal force target value, the total lateral force target value, and the total yaw moment target value are met; and
providing, by the system, the first wheel torque value and the second wheel torque value to the drive axle.

2. The method of claim 1, further comprising:
providing, by the system, a formula or a look-up table of the total power consumption of the drive axle and the power assisted steering unit as a function of the first wheel torque value and the second wheel torque value.

3. The method of claim 1, further comprising:
determining, by the system, the first wheel torque value and the second wheel torque value under the condition that a rear lateral force is equal or below a rear lateral force threshold.

4. The method of claim 3, further comprising:
deactivating, by the system, the propulsion torque distribution unit if the rear lateral force exceeds a rear lateral force deactivation threshold.

5. The method of claim 1, further comprising:
deactivating, by the system, the propulsion torque distribution unit if a rear side slip exceeds a rear side slip threshold.

6. A non-transitory computer-readable medium, comprising executable instructions that, when executed by a processor, facilitate performance of operations, comprising:
receiving a total longitudinal force target value, a total lateral force target value and a total yaw moment target value applicable to a vehicle comprising at least one drive axle with a left output shaft and a right output shaft, and a power assisted steering unit;
determining a first wheel torque value for the left output shaft and a second wheel torque value for the right output shaft which minimize a total power consumption of a drive axle and the power assisted steering unit under a condition that the total longitudinal force target value, the total lateral force target value, and the total yaw moment target value are met; and
providing the first wheel torque value and the second wheel torque value to the drive axle.

7. The non-transitory computer-readable medium of claim 6, wherein the operations further comprise:
providing a formula or a look-up table of the total power consumption of the drive axle and the power assisted steering unit as a function of the first wheel torque value and the second wheel torque value.

8. The non-transitory computer-readable medium of claim 6, wherein the operations further comprise:

determining the first wheel torque value and the second wheel torque value under the condition that a rear lateral force is equal or below a rear lateral force threshold.

9. The non-transitory computer-readable medium of claim 8, wherein the operations further comprise:
    deactivating a propulsion torque distribution unit if the rear lateral force exceeds a rear lateral force deactivation threshold, wherein the propulsion torque distribution unit is configured to allocate wheel torques of different magnitudes to the left output shaft and the right output shaft respectively.

10. The non-transitory computer-readable medium of claim 6, wherein the operations further comprise:
    deactivating a propulsion torque distribution unit if a rear side slip exceeds a rear side slip threshold, wherein the propulsion torque distribution unit is configured to allocate wheel torques of different magnitudes to the left output shaft and the right output shaft respectively.

11. A vehicle propulsion system comprising:
    a processor; and
    a memory that stores executable instructions that, when executed by the processor, facilitate performance of operations, comprising:
    receiving a total longitudinal force target value, a total lateral force target value and a total yaw moment target value applicable to a vehicle comprising at least one drive axle with a left output shaft and a right output shaft, and a power assisted steering unit;
    determining a first wheel torque value for the left output shaft and a second wheel torque value for the right output shaft which minimize a total power consumption of a drive axle and the power assisted steering unit under a condition that the total longitudinal force target value, the total lateral force target value, and the total yaw moment target value are met; and
    providing the first wheel torque value and the second wheel torque value to the drive axle.

12. The vehicle propulsion system of claim 11, wherein the drive axle comprises a left electric machine coupled to the left output shaft and a right electric machine coupled to the right output shaft.

13. The vehicle propulsion system of claim 11, further comprising:
    a rear side slip detector that determines a rear side slip of the vehicle.

14. The vehicle propulsion system of claim 11, wherein the operations further comprise:
    providing a formula or a look-up table of the total power consumption of the drive axle and the power assisted steering unit as a function of the first wheel torque value and the second wheel torque value.

15. The vehicle propulsion system of claim 11, wherein the operations further comprise:
    determining the first wheel torque value and the second wheel torque value under the condition that a rear lateral force is equal or below a rear lateral force threshold.

16. The vehicle propulsion system of claim 15, wherein the operations further comprise:
    deactivating a propulsion torque distribution unit if the rear lateral force exceeds a rear lateral force deactivation threshold, wherein the propulsion torque distribution unit is configured to allocate wheel torques of different magnitudes to the left output shaft and the right output shaft respectively.

17. The vehicle propulsion system of claim 11, wherein the operations further comprise:
    deactivating a propulsion torque distribution unit if a rear side slip exceeds a rear side slip threshold, wherein the propulsion torque distribution unit is configured to allocate wheel torques of different magnitudes to the left output shaft and the right output shaft respectively.

18. The vehicle propulsion system of claim 11, wherein the operations further comprise:
    allocating wheel torques of different magnitudes to the left output shaft and the right output shaft respectively.

* * * * *